(12) United States Patent
Hwang

(10) Patent No.: US 11,077,980 B2
(45) Date of Patent: Aug. 3, 2021

(54) VACUUM-SEALED CONTAINER

(71) Applicant: Sang Woo Hwang, Gyeonggi-do (KR)

(72) Inventor: Sang Woo Hwang, Gyeonggi-do (KR)

(73) Assignee: JCHIGLOBAL CO., LTD., Gyeonggi-do (KR)

( * ) Notice: Subject to any disclaimer, the term of this patent is extended or adjusted under 35 U.S.C. 154(b) by 146 days.

(21) Appl. No.: 16/314,235

(22) PCT Filed: Jun. 29, 2017

(86) PCT No.: PCT/KR2017/006873
§ 371 (c)(1),
(2) Date: Jan. 24, 2019

(87) PCT Pub. No.: WO2018/008894
PCT Pub. Date: Jan. 11, 2018

(65) Prior Publication Data
US 2019/0202590 A1    Jul. 4, 2019

(30) Foreign Application Priority Data

Jul. 4, 2016    (KR) .................... 10-2016-0084373

(51) Int. Cl.
*B65D 51/16* (2006.01)
*B65D 1/22* (2006.01)
(Continued)

(52) U.S. Cl.
CPC ............ *B65D 1/22* (2013.01); *B65D 1/40* (2013.01); *B65D 43/02* (2013.01);
(Continued)

(58) Field of Classification Search
CPC ............ B65D 51/16; B65D 51/1644; B65D 51/1605; B65D 81/20; B65D 81/24; B65D 43/0218; A47J 27/09; F16K 51/02
(Continued)

(56) References Cited

U.S. PATENT DOCUMENTS

| | | | |
|---|---|---|---|
| 4,759,461 A * | 7/1988 | Sharples | B65D 83/0005 220/578 |
| 9,517,865 B2 * | 12/2016 | Albers | B65D 43/022 |
| 2014/0076894 A1 * | 3/2014 | Chen | B65D 45/02 220/203.19 |

FOREIGN PATENT DOCUMENTS

| | | |
|---|---|---|
| JP | 02180217 A | 7/1990 |
| JP | 8004439 Y2 | 2/1996 |

(Continued)

*Primary Examiner* — Steven A. Reynolds
(74) *Attorney, Agent, or Firm* — Christensen, Fonder, Dardi & Herbert PLLC; John Fonder

(57) ABSTRACT

A vacuum-sealed container wherein a large negative pressure is applied inside the container without using a pump, making it possible to store food for a long time; the container can be sealed without using a packing. The vacuum-sealed container includes: a container body having a lid coupling groove formed along the periphery of the upper end portion of an opening and arranged along a closed path; a lid body formed to be convex upward using an elastic material, the lid body having a sealing portion formed thereon such that the same is inserted into the lid coupling groove along the periphery thereof so as to seal the inside of the container body; and a valve installed on the lid body so as to provide a passage, through which air inside the container body is discharged to the outside, and so as to expose/cover the passage.

7 Claims, 7 Drawing Sheets

(51) Int. Cl.
  *B65D 1/40*       (2006.01)
  *B65D 81/20*      (2006.01)
  *B65D 81/24*      (2006.01)
  *F16K 51/02*      (2006.01)
  *F16K 15/00*      (2006.01)
  *B65D 47/18*      (2006.01)
  *B65D 43/02*      (2006.01)
(52) U.S. Cl.
  CPC ......... *B65D 43/0214* (2013.01); *B65D 47/18* (2013.01); *B65D 51/16* (2013.01); *B65D 81/20* (2013.01); *B65D 81/24* (2013.01); *F16K 15/00* (2013.01); *F16K 51/02* (2013.01)
(58) Field of Classification Search
  USPC ...... 220/367.1, 203.29, 203.19, 203.01, 231, 220/203.05, 203.06, 203.28, 203.04
  See application file for complete search history.

(56) References Cited

FOREIGN PATENT DOCUMENTS

| | | |
|---|---|---|
| JP | 2006112451 A | 4/2006 |
| JP | 2008081184 A | 4/2008 |
| KR | 100759487 B1 | 9/2007 |
| KR | 101246244 B1 | 3/2013 |

\* cited by examiner

VACUUM-SEALED CONTAINER

The application is a National Stage filing of PCT/KR2017/006873, filed Jun. 29, 2017, which claims priority to Korean Patent Application No.: KR10-2016-0084373, FILED Jul. 4, 2016, both of which are incorporated herein by reference.

FIELD OF THE INVENTION

The present invention relates to an improvement on a vacuum-sealed container, and particularly, to an improvement on a vacuum-sealed container in which negative pressure may be applied in the container.

BACKGROUND OF THE INVENTION

In general, food is stored in a typical food container and then stored in a refrigerator, but food having moisture is comparatively easily spoiled. Recently, vacuum-sealed containers, which are capable of storing food by lowering air pressure in the containers below the atmospheric pressure in order to store food, which may be easily spoiled, over a long period of time, have been widely developed, commercialized, and offered on the market.

As the related art associated with the vacuum-sealed container, Korean Patent No. 10-1246244 (Title of Invention: Vacuum-Sealed Container, Inventor: Sang-Min Song) and the like disclose the vacuum-sealed containers in detail. The vacuum-sealed container in the related art is configured to discharge air in the container to the outside of the container by using a pump in order to apply relatively high negative pressure to the interior of the container.

In a case in which the pump is not used, elastic deformation of a packing needs to be used to discharge the air in the container to the outside of the container, but it is difficult to increase vertical displacement of the packing, and elastic force of the packing is not high, and as a result, it is difficult for high negative pressure to be applied to the interior of the container.

In addition, because the vacuum-sealed container in the related art is sealed by the packing installed on a lid, the packing is necessarily required. The packing is often withdrawn from a mounting groove, and in this case, a user is inconvenienced because the user needs to insert the packing into the mounting groove again to use the packing.

In addition, there is a high likelihood that food leftovers or soup will flow to the inside of the packing, and in this case, there is a problem in that the packing needs to be separated from the packing groove, cleanly washed, and then mounted in the packing groove.

In addition, in the case of the typical container in the related art, four locking members are installed at an interval of 90 degrees on the lid and the four locking members need to be always manipulated to open or close the lid, or the lid needs to be pressed along an overall circumference of the lid so that a portion, where the packing is installed, engages with a groove or a protrusion of the container. As a result, there is a problem in that it is inconvenient to use the typical container.

SUMMARY OF THE INVENTION

An object of the present invention is to provide a vacuum-sealed container in which high negative pressure is applied to the interior of the container even without a pump.

Another object of the present invention is to provide a vacuum-sealed container which may be sealed without using a packing and enables negative pressure, which is relatively higher than negative pressure applied to an interior of a container in the related art, to be applied to the interior of the container.

Still another object of the present invention is to provide a vacuum-sealed container in which a container main body and a lid each have an uncomplicated coupling structure such that the vacuum-sealed container is easily manufactured and foreign substances are easily removed.

Yet another object of the present invention is to provide a convenient container which enables a lid to be closed only by pushing the lid once or only by pushing the lid once and then slightly manipulating a valve and enables the lid to be opened only by manipulating the valve once more.

A vacuum-sealed container according to the present invention includes: a container main body which has a lid coupling groove formed along an edge of an upper end portion of the container having an opening and disposed along a closed route; a lid main body which is made of a material having elasticity and formed to be convex upward, and has a sealing portion that is formed along an edge of the lid main body and inserted into the lid coupling groove to seal an interior of the container main body; and a valve which is installed on the lid main body to provide a passageway through which air in the container main body is discharged to the outside, the valve being configured to open or close the passageway.

The lid coupling groove may be disposed such that an opening of the lid coupling groove is directed toward the inside of the container main body, and an inner surface of the lid coupling groove may become gradually higher outward.

The sealing portion may be formed to have a circular cross section or an elliptical cross section and have a thickness greater than a thickness of the remaining portion of the lid main body other than the portion where the sealing portion is installed.

As necessary, elastic protrusions, which come into close contact with an inner surface of the lid coupling groove while being bent in a radial direction of the container main body, may be installed on an upper surface and/or a lower surface of the sealing portion. The elastic protrusion may be formed to have a pointed tip and may be formed by coating the sealing portion with rubber such as silicone rubber.

A thickness of the portion of the lid main body where the sealing portion is installed may be smaller than a thickness of a central portion of the lid main body. The thickness of the lid main body may be gradually decreased from the central portion to the edge of the lid main body.

The lid main body may be appropriately made of plastic having elasticity. Medium-quality plastic such as medium-quality polyurethane, which has elasticity at an intermediate degree between softness and hardness, may be suitable for the plastic having elasticity.

The valve may include: a valve main body which is coupled to the lid main body, has therein a first air passageway, and has a first thread; and a valve handle which has a second thread fastened to the first thread, has a second air passageway, and allows the second air passageway to be connected to or disconnected from the first air passageway in accordance with a degree to which the second thread is fastened to the first thread.

As necessary, the valve may be a check valve that permits air in the container main body to be discharged to the outside and prevents outside air from flowing into the container main body.

According to the present invention, it is possible to maintain a high degree of vacuum by applying high negative pressure to the interior of the container even without using a pump in comparison with the related art, and as a result, it is possible to store food over a long period of time.

According to the present invention, it is possible to seal the container without using a packing, and as a result, it is possible to reduce manufacturing costs to the extent of not using the packing.

In addition, according to the present invention, the container main body and the lid each have an uncomplicated coupling structure, and as a result, the container is easily manufactured, foreign substances are easily removed, and there is no inconvenience of inserting a packing when the packing is withdrawn in use.

According to the present invention, it is possible to obtain the vacuum-sealed container which enables the lid to be closed only by pushing the lid once or only by pushing the lid once and then slightly manipulating the valve and enables the lid to be opened only by manipulating the valve once more, and as a result, it is very convenient to open and close the lid like a typical pot.

DETAILED DESCRIPTION

Hereinafter, an exemplary embodiment of the present invention will be described with reference to the accompanying drawings.

Figure 1:
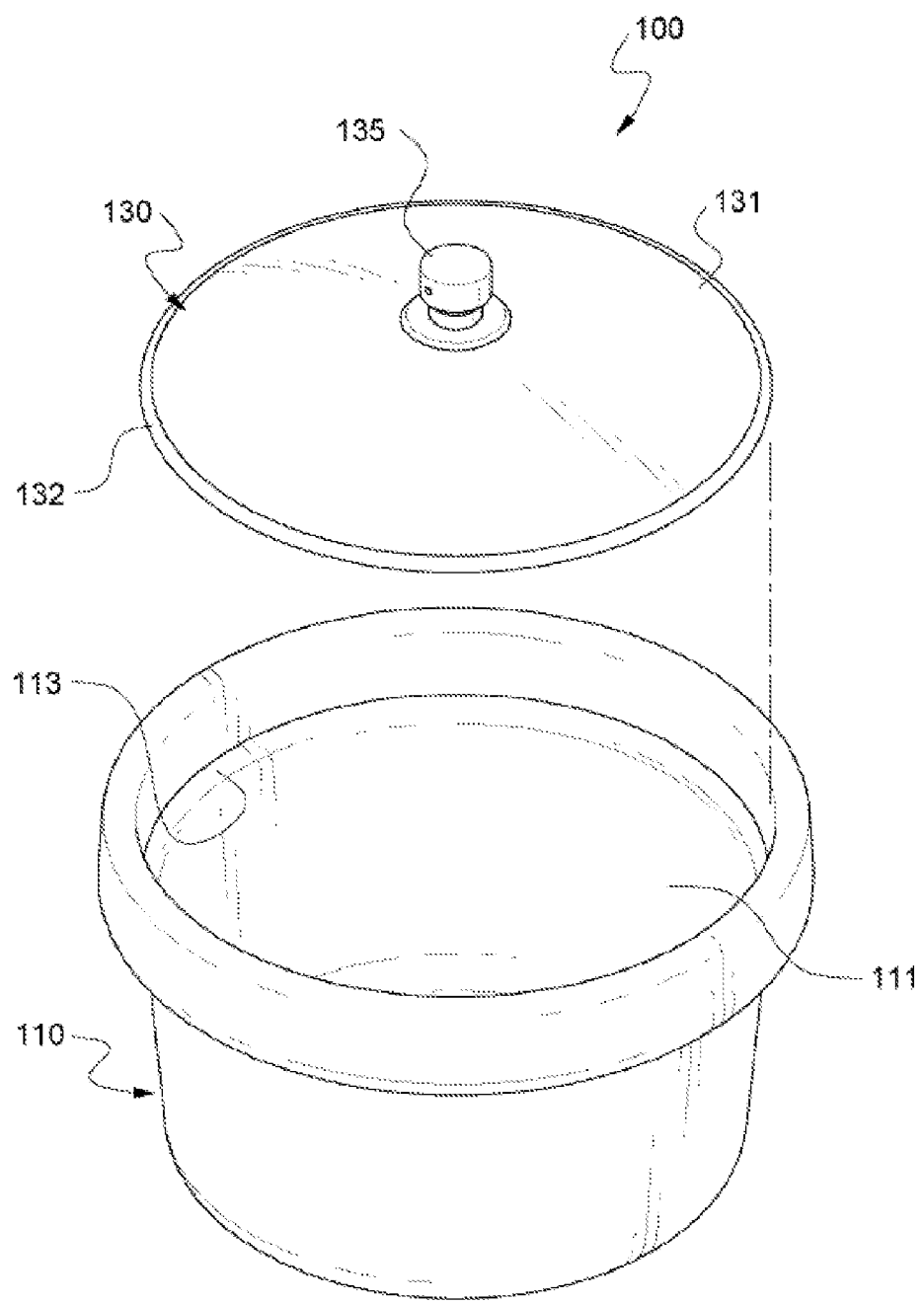
FIG. 1 is a perspective view of a vacuum-sealed container according to the present invention.
Figure 2:
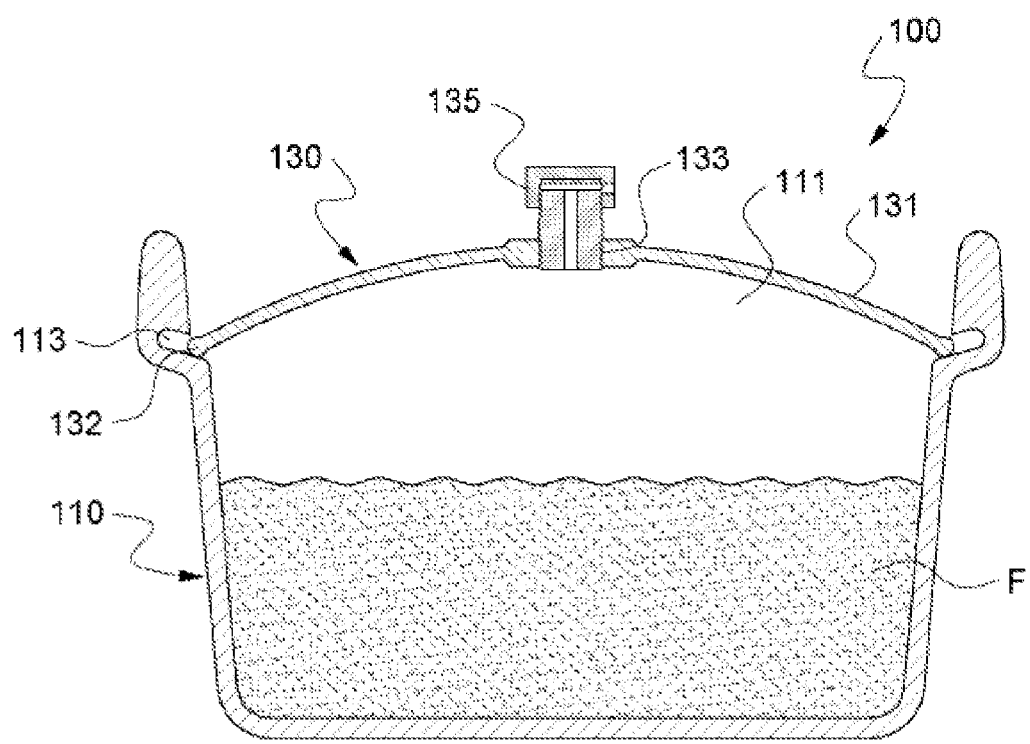
FIG. 2 is a cross-sectional view of the vacuum-sealed container in an unsealed state according to the present invention.
Figure 3:
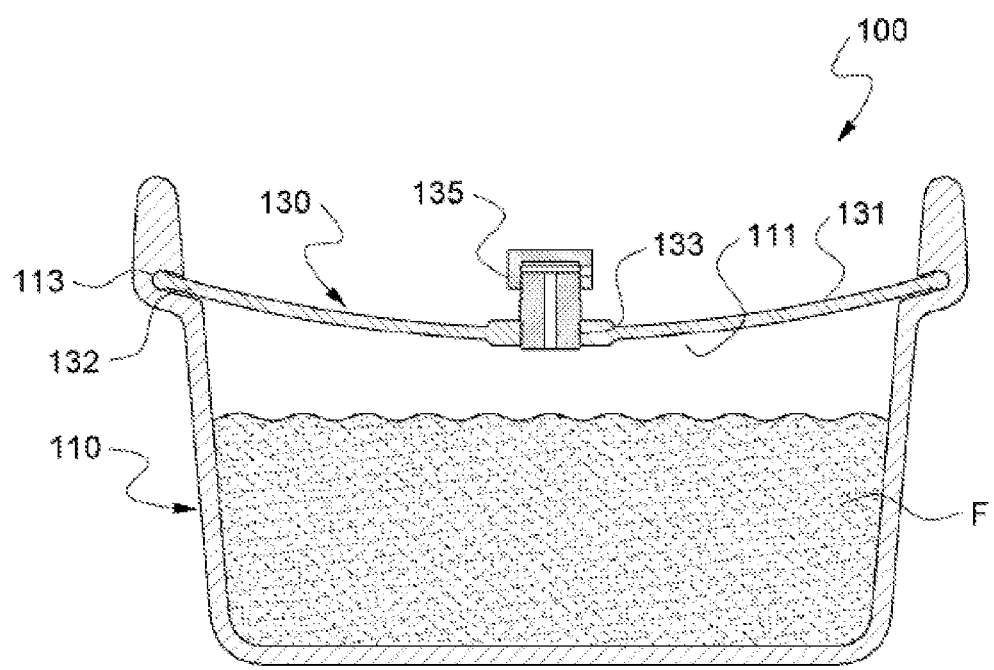
FIG. 3 is a cross-sectional view of the vacuum-sealed container according to the present invention in a state in which air in a container main body is discharged.
Figure 4:
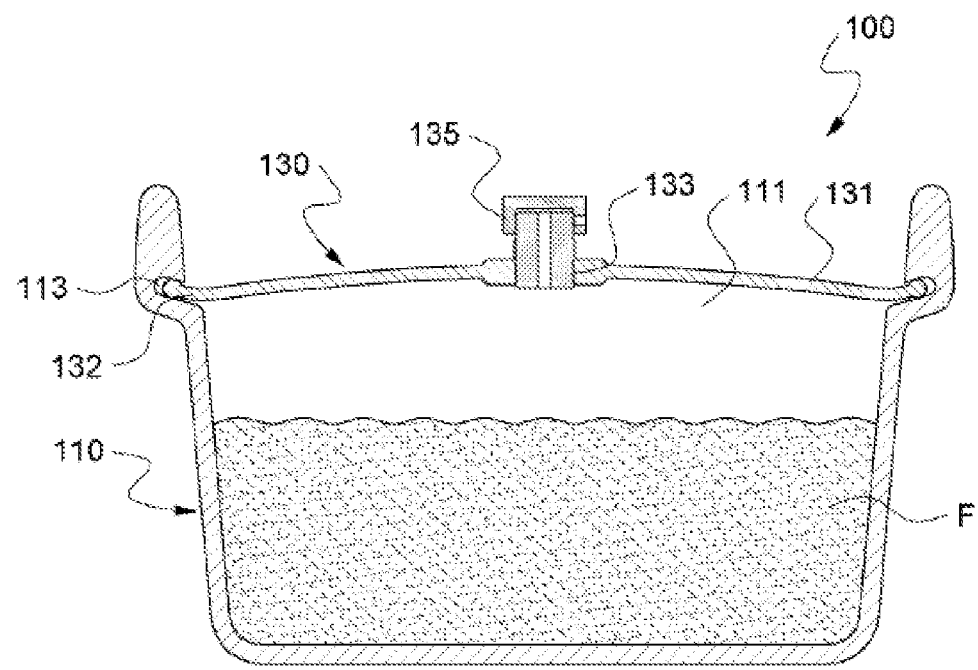
FIG. 4 is a cross-sectional view of the vacuum-sealed container according to the present invention in a state in which negative pressure is applied to the interior of the container main body.
Figure 5:
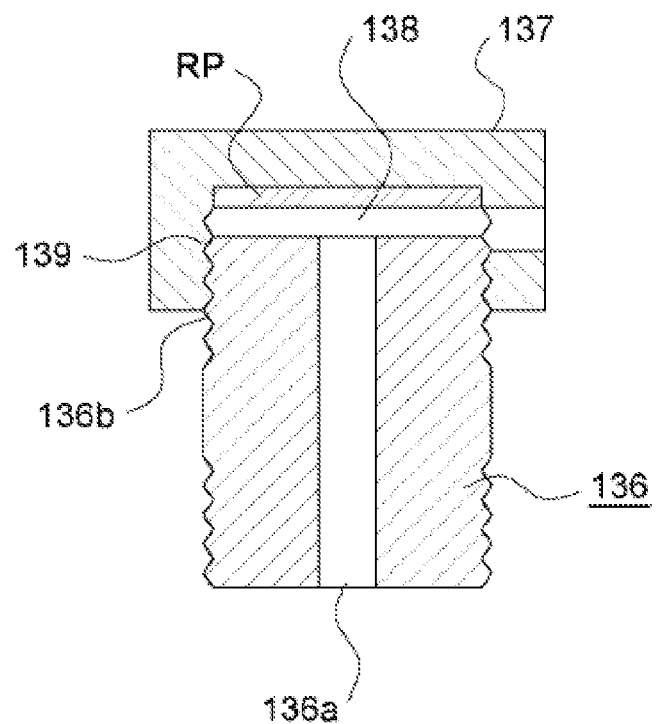
FIG. 5 is a cross-sectional view of a valve in an opened state.
Figure 6:
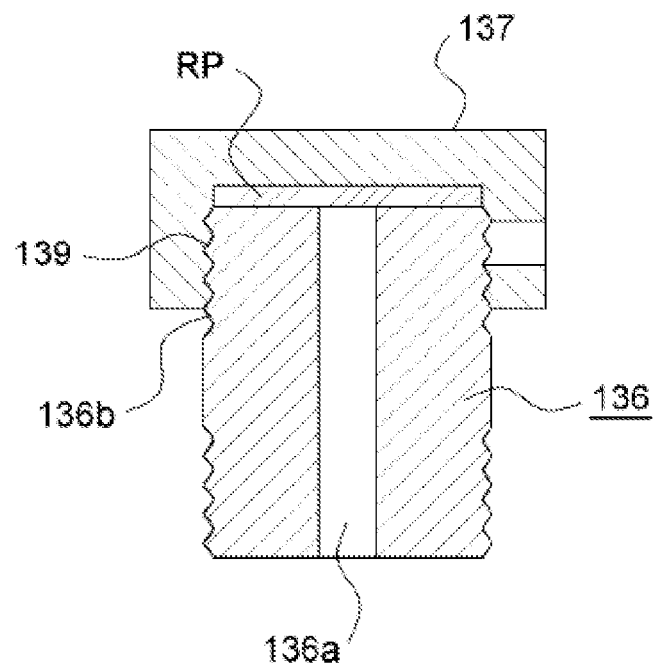
FIG. 6 is a cross-sectional view of the valve in a closed state.

FIG. 1 is a perspective view of a vacuum-sealed container according to the present invention, FIG. 2 is a cross-sectional view of the vacuum-sealed container in an unsealed state according to the present invention, FIG. 3 is a cross-sectional view of the vacuum-sealed container according to the present invention in a state in which air in a container main body is discharged, FIG. 4 is a cross-sectional view of the vacuum-sealed container according to the present invention in a state in which negative pressure is applied to the interior of the container main body, FIG. 5 is a cross-sectional view of a valve in an opened state, and FIG. 6 is a cross-sectional view of the valve in a closed state.

Referring to FIGS. 1 to 6, a vacuum-sealed container 100 according to the present invention has a container main body 110 having an opening 111, and a lid 130 for opening or closing the opening 111.

A lid coupling groove 113 is formed along an edge of an upper end portion of the container main body 110 where the opening 111 is formed. The lid coupling groove 113 is disposed along a closed route, and the closed route preferably has a circular shape.

As illustrated in FIGS. 2 to 4, the lid coupling groove 113 is disposed such that an opening of the lid coupling groove 113 is directed toward the inside of the container main body 110, and an inner surface of the lid coupling groove 113 is formed to become gradually higher outward. In this way, it is possible to increase a degree to which a lid main body 131 is allowed to be deformed with respect to a thickness of the upper end portion of the container main body 110. The inner surface of the lid coupling groove 113 may be formed horizontally, as necessary, but in this case, there is a problem in that a thickness of the container main body 110 needs to be increased. Further, the inner surface of the lid coupling groove 113 may be formed to become gradually lower outward, but in this case, there is a problem in that the deformation amount of the lid main body 131 cannot be increased.

The lid 130 has the lid main body 131, and a valve 135 installed on the lid main body 131. The lid main body 131 is made of a material having elasticity so that the lid main body 131 may be elastically deformed when pressed by hand, and the lid main body 131 is formed convexly upward.

Medium-quality plastic such as medium-quality polyurethane, which has elasticity at an intermediate degree between softness and hardness, is suitable for the material having elasticity. A sealing portion 132, which is inserted into the lid coupling groove 113 to seal the interior of the container main body 110, is formed along the edge of the lid main body 131. In the exemplary embodiment, the sealing portion 132 is shaped to have a circular cross section, and the sealing portion 132 is formed to be blunt and has a thickness greater than a thickness of the remaining portion of the lid main body 131 inside the sealing portion 132 other than the portion where the sealing portion 132 is installed. Of course, the sealing portion 132 may have an elliptical cross section.

Preferably, a valve mounting portion 133 is formed at a central portion of the lid main body 131, and the valve 135 is mounted in the valve mounting portion 133, as illustrated in FIGS. 5 and 6. The valve 135 is installed on the lid main body 131 and provides a passageway through which air in the container main body 110 is discharged to the outside. The valve 135 serves to open or close the passageway, as necessary, and the valve 135 includes a valve main body 136 and a valve handle 137.

The valve main body 136 is mounted in the valve mounting portion 133 formed in the form of a through hole vertically penetrating the lid main body 131. The valve main body 136 has therein a first air passageway 136a, and has a first thread 136b formed on an outer circumferential surface thereof.

The valve handle 137 has a second air passageway 138 that may allow the first air passageway 136a to communicate with the outside, and the valve handle 137 has a second thread 139 which is formed on an inner circumferential surface of the valve handle 137 and fastened to the first thread 136b. The valve handle 137 may serve to allow the first air passageway 136a to communicate with the second air passageway 138 and to open or close the first air passageway 136a in accordance with a degree to which the valve handle 137 is locked.

Preferably, a rubber plate RP is mounted on an inner surface of the valve handle 137, such that the first air passageway 136a may be more reliably sealed when the valve handle 137 is locked.

In the states illustrated in FIGS. 2, 3 and 5, the first air passageway 136a is connected to the second air passageway 138 such that the first air passageway 136a is opened to the outside. Therefore, the interior of the container main body 110 communicates with the outside, such that air may freely flow into or out of the container main body 110.

When the valve handle 137 is rotated to one side in the state in FIG. 5, the first air passageway 136a is disconnected from the second air passageway 138, as illustrated in FIGS. 4 and 6. Therefore, the internal space of the container main body 110 is blocked from the outside, such that the inflow and the outflow of the air are blocked.

Referring to FIGS. 1 to 6, a process of using the vacuum-sealed container 100 according to the present invention will be described below.

The central portion of the lid main body 131 is pushed downward in a state in which food F to be stored is put into the container main body 110, the opening 111 is covered by the lid 130 as illustrated in FIG. 2, and then the first air passageway 136a communicates with the second air passageway 138, as illustrated in FIG. 5, as the valve handle 137 is rotated. Therefore, as illustrated in FIG. 3, the central portion of the lid main body 131 is elastically deformed downward, and air in the container main body 110 is discharged to the outside through the first and second air passageways 136a and 138.

As the central portion of the container main body 110 is elastically deformed downward, the edge of the lid main body 131, where the sealing portion 132 is installed, is spread outward, such that the sealing portion 132 is inserted into the lid coupling groove 113.

When the sealing portion 132 is inserted into the lid coupling groove 113, the portion between the edge of the opening 111 of the lid main body 131 and the edge of the lid main body 131 is blocked. An upper surface of the sealing portion 132 comes into contact with an upper surface of the lid coupling groove 113, and a lower surface of the sealing portion 132 comes into contact with a lower surface of the lid coupling groove 113, such that double sealing is made.

When the valve handle 137 is rotated in the state in which the central portion of the lid main body 131 is pressed downward, the second air passageway 138 blocks the first air passageway 136a. When force applied to the container main body 110 is eliminated in the state in which the air passageway is blocked from the outside as described above, the container main body 110 is about to be spread upward by its own elastic force, and thus a volume of the internal space surrounded by the container main body 110 and the lid 130 is increased, as illustrated in FIG. 3, such that the volume of the internal space becomes as illustrated in FIG. 4, and negative pressure is applied to the interior of the container main body 110.

In order to take out the food stored in the vacuum-sealed container 100 in the state in which the food, which is put into the vacuum-sealed container 100 as illustrated in FIG. 4, is stored in a refrigerator, the valve handle 137 is rotated so that the first air passageway 136a is connected to the second air passageway 138, as illustrated in FIG. 5. When the first air passageway 136a is connected to the second air passageway 138, outside air flows into the container main body 110 through the first and second air passageways 136a and 138, such that air pressure in the container main body 110 becomes the atmospheric pressure. Therefore, the lid main body 131 returns back to the original state by its own elasticity, as illustrated in FIG. 2. In this state, the user holds the valve handle 137, opens the lid 130, and then takes out the food.

According to the aforementioned vacuum-sealed container 100 according to the present invention, a large amount of air may be discharged as the lid having a large area is elastically deformed, such that a degree of vacuum may be increased in comparison with the related art, and the vacuum-sealed container 100 may be configured without using a packing, and as a result, unit price of a product may be reduced, and the product may be more easily used. In addition, since the vacuum-sealed container 100 according to the present invention does not use a packing, there is no inconvenience caused by the withdrawal of the packing, and foreign substances are easily removed.

Figure 7:
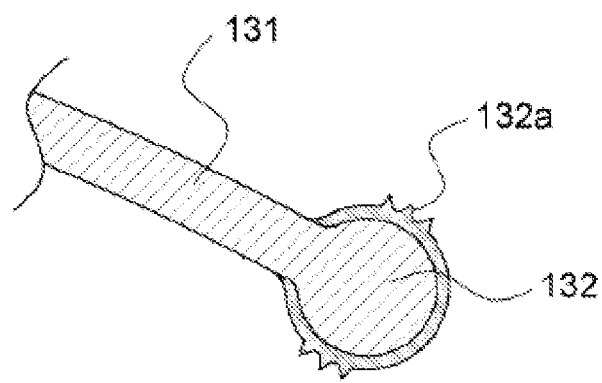
FIG. 7 is a view illustrating a modified example of a sealing portion.

FIG. 7 is a view illustrating a modified example of the sealing portion. The sealing portion will be described with reference to FIGS. 1 to 6.

The outer circumferential surface of the sealing portion 132 is coated with silicone rubber or the like, as necessary. Elastic protrusions 132a, which come into close contact with the inner surface of the lid coupling groove 113 while being bent in a radial direction of the container main body 110, are formed on the upper surface, the lower surface, or both of the upper and lower surfaces of the sealing portion 132 that come into contact with the inner surface of the lid coupling groove 113, as illustrated in FIGS. 1 to 3, and the elastic protrusions 132a may be continuously formed along an overall circumference of the sealing portion 132. The elastic protrusion may be installed in two rows or in three or more rows. In this way, it is possible to further increase sealability of the sealing portion 132. The descriptions of the remaining parts are the same as described with reference to FIGS. 1 to 6.

Figure 8:
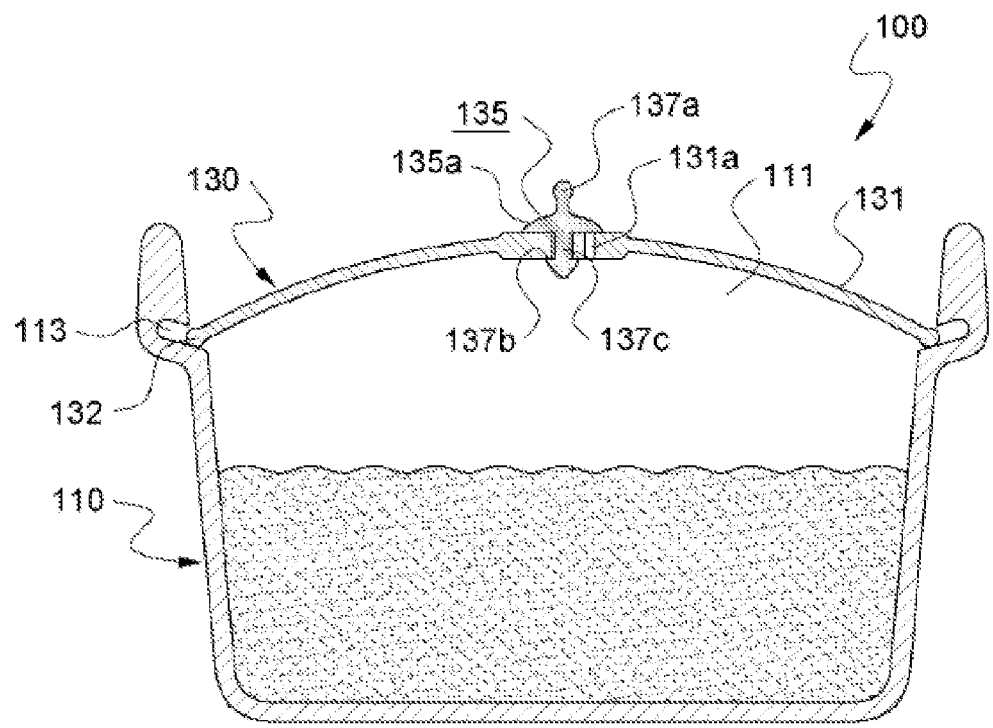
FIG. 8 is a cross-sectional view illustrating a modified example of the vacuum-sealed container according to the present invention.

FIG. 8 is a cross-sectional view illustrating a modified example of the vacuum-sealed container according to the present invention.

A check valve, which permits air in the container main body 110 to be discharged to the outside and prevents outside air from flowing into the container main body 110, may be used as the valve 135, as necessary. The check valve is made of a material such as silicone rubber having elasticity and has a valve main body 135a which has a handle 137a installed on an upper surface of the valve main body 135a, and a catching portion 137c which extends downward from a bottom surface of the valve main body 135a and has a catching projection 137b that is formed on a lower end portion of the catching portion 137c and caught by a bottom surface of the lid. An air hole 131a is formed in the lid main body 131 at a position where the air hole 131a is covered by the valve main body 135a. The bottom surface of the valve main body 135a may be configured as a flat surface, but may be formed to have an upwardly concave groove.

That is, when the lid main body 131 is pushed, the volume surrounded by the container main body 110 and the lid main body 131 is decreased, and the internal pressure is increased, such that air in the container main body 110 flows to a space between the lid main body 131 and the valve main body 135a through the air hole 131a and then is discharged to the outside while lifting up the edge of the valve main body 135a. In this case, the sealing portion 132 is inserted into the lid coupling groove 113, thereby sealing the edge of the lid main body 131 and the edge of the container main body 110. When the lid main body 131 is sufficiently pushed and then external force is eliminated, the lid main body 131 is deformed upward by its own elastic force, such that negative pressure is applied to the interior of the container main body 110, the lid main body 131 is deformed to a state in which the negative pressure balances with the elastic force of the lid main body 131, and this state is maintained.

In order to open the lid 130, the handle 137a of the check valve is pushed laterally, and one edge of the valve main body 135a is lifted up, such that outside air flows into the container main body 110 through the air hole 131a, and pressure in the container main body 110 becomes the atmospheric pressure. Therefore, the lid main body 131 returns back to the original state by its own elastic force, and the sealing portion 132 is withdrawn from the lid coupling groove 113.

The descriptions of the remaining parts are the same as described with reference to FIGS. 1 to 4.

The present invention may be used to manufacture the vacuum-sealed container without using a packing.

What is claimed is:

1. A vacuum-sealed container comprising:
    a container main body, which has a lid coupling groove formed along an edge of an upper end portion of an opening and disposed along a closed route;
    a lid main body, which is made of a material having elasticity and formed to be convex upward, and has a sealing portion that is formed along an edge of the lid main body and is inserted into the lid coupling groove to seal an interior of the container main body; and
    a valve, which is installed on the lid main body to provide a passageway through which air in the container main body is discharged to the outside, the valve being configured to open or close the passageway;
    wherein the lid coupling groove is disposed such that an opening of the lid coupling groove is directed toward an inside of the container main body, and an inner surface of the lid coupling groove becomes gradually higher outwardly,
    when the sealing portion is inserted into the lid coupling groove, an upper surface of the sealing portion comes into contact with an upper surface of the lid coupling groove, and a lower surface of the sealing portion comes into contact with a lower surface of the lid coupling groove, such that double sealing is made,
    wherein the lid main body is characterized as follows:
    (i) when a central portion of the lid main body is pressed downward in a state in which the air passageway is open, the lid main body is elastically deformed convexly downwardly,
    (ii) when the force applied to the container main body is eliminated, the lid main body is to be spread upward by its own elastic force.

2. The vacuum-sealed container of claim 1, wherein the sealing portion is formed to have a circular cross section or an elliptical cross section and have a thickness greater than a thickness of the remaining portion of the lid main body other than the portion where the sealing portion is located.

3. The vacuum-sealed container of claim 1, wherein elastic protrusions, which come into close contact with the inner surface of the lid coupling groove while being bent in a radial direction of the container main body, are installed on an upper surface and/or a lower surface of the sealing portion.

4. The vacuum-sealed container of claim 1, wherein a thickness of the portion of the lid main body where the sealing portion is located is smaller than a thickness of the central portion of the lid main body.

5. The vacuum-sealed container of claim 1, wherein the lid main body is made of plastic having elasticity.

6. The vacuum-sealed container of claim 1, wherein the valve includes: a valve main body which is coupled to the lid main body, has therein a first air passageway, and has a first thread; and a valve handle which has a second thread fastened to the first thread, has a second air passageway, and allows the second air passageway to be connected to or disconnected from the first air passageway in accordance with a degree to which the second thread is fastened to the first thread.

7. The vacuum-sealed container of claim 1, wherein the valve is a check valve that permits air in the container main body to be discharged to the outside and prevents outside air from flowing into the container main body.

* * * * *